US010690879B2

(12) United States Patent
Ooya

(10) Patent No.: US 10,690,879 B2
(45) Date of Patent: Jun. 23, 2020

(54) LENS BARREL AND IMAGING DEVICE

(71) Applicant: Takahiro Ooya, Kanagawa (JP)

(72) Inventor: Takahiro Ooya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 124 days.

(21) Appl. No.: 15/917,920

(22) Filed: Mar. 12, 2018

(65) Prior Publication Data

US 2018/0259739 A1    Sep. 13, 2018

(30) Foreign Application Priority Data

Mar. 13, 2017    (JP) .................................. 2017-046858

(51) Int. Cl.
| G02B 7/02 | (2006.01) |
| G02B 7/04 | (2006.01) |
| G02B 7/16 | (2006.01) |
| G02B 7/09 | (2006.01) |

(52) U.S. Cl.
CPC ................ *G02B 7/04* (2013.01); *G02B 7/09* (2013.01); *G02B 7/16* (2013.01)

(58) Field of Classification Search
CPC .............. G02B 7/04; G02B 7/09; G02B 7/16
USPC .............. 359/698–706, 821–830; 396/79, 80
See application file for complete search history.

(56) References Cited

U.S. PATENT DOCUMENTS

2003/0128973 A1*  7/2003  Shinohara ................ G02B 7/04
                                                        396/25

FOREIGN PATENT DOCUMENTS

| JP | 63-291017 | 11/1988 |
| JP | 2013-003446 | 1/2013 |
| JP | 2016-109960 | 6/2016 |

* cited by examiner

*Primary Examiner* — William Choi
(74) *Attorney, Agent, or Firm* — Oblon, McClelland, Maier & Neustadt, L.L.P.

(57) ABSTRACT

A lens barrel includes a movable device to adjust an optical system, an operation section, and a display section. The operation section has a coupling section to be coupled with the movable device to control movement of the movable device. The display section is disposed in line with the operation section in a direction around an optical axis of the lens barrel to overlap with the operation section in a direction of the optical axis. The display section includes a display body that is movable in displaying a state of the optical system adjusted by the movable device. The display body of the display section is disposed to overlap the coupling section of the operation section in a radial direction of the lens barrel.

15 Claims, 14 Drawing Sheets

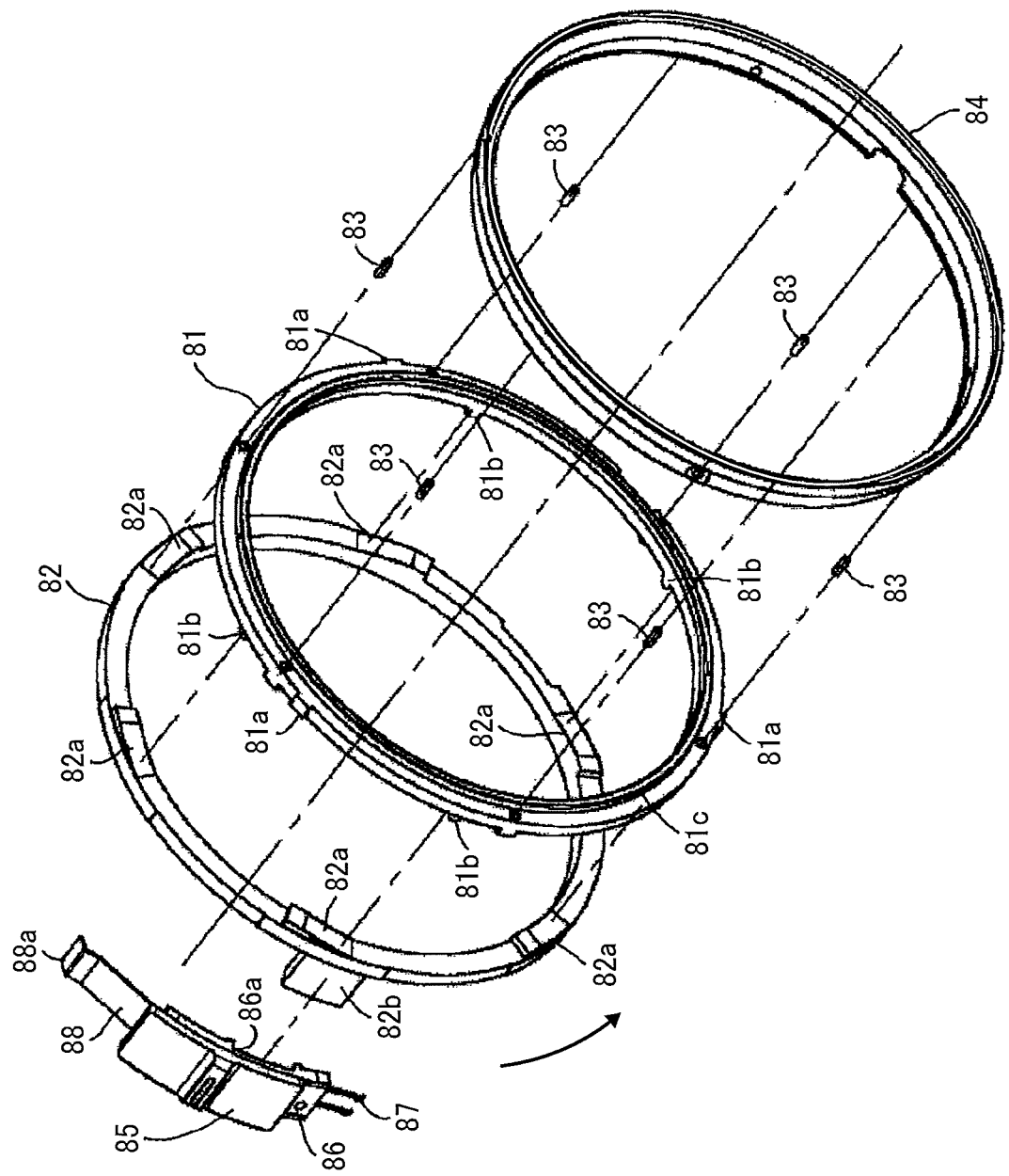

LENS BARREL AND IMAGING DEVICE

CROSS-REFERENCE TO RELATED APPLICATIONS

This patent application is based on and claims priority pursuant to 35 U.S.C. § 119(a) to Japanese Patent Application No. 2017-046858, filed on Mar. 13, 2017, in the Japan Patent Office, the entire disclosure of which is hereby incorporated by reference herein.

BACKGROUND

Technical Field

Embodiments of the present disclosure relate to a lens barrel and an imaging device including the lens barrel.

Background Art

A lens barrel, such as an interchangeable lens used for, e.g., an auto-focus single lens reflex camera, is known that includes an automatic focus adjusting device and a manual focus adjusting device, either one of which is used to adjust focus of the lens barrel. Such a lens barrel includes an operation member for switching between automatic focus (AF) and manual focus (MF). With the operation member, a user switches between AF and MF. In addition, the lens barrel is often provided with a distance scale for the user to check the in-focus position.

SUMMARY

In an aspect of this disclosure, there is provided an improved lens barrel includes a movable device to adjust an optical system, an operation section, and a display section. The operation section has a coupling section to be coupled with the movable device to control movement of the movable device. The display section is disposed in line with the operation section in a direction around an optical axis of the lens barrel to overlap with the operation section in a direction of the optical axis. The display section includes a display body that is movable in displaying a state of the optical system adjusted by the movable device. The display body of the display section is disposed to overlap the coupling section of the operation section in a radial direction of the lens barrel.

In another aspect of this disclosure, there is provided an improved imaging device including the above-described lens barrel.

In even another aspect of this disclosure, there is provided an improved lens barrel including a movable device to perform a focus adjustment of an optical system, a switch, and a display section. The switch switches between an automatic focus adjustment mode and a manual focus adjustment mode, with the movable device. The display section is disposed to overlap the switch in a direction of an optical axis of the lens barrel and overlap the switch in a part in a radial direction of the lens barrel. The display section displays a state of the optical system adjusted by the movable device.

BRIEF DESCRIPTION OF THE DRAWINGS

FIG. 7 is a partially-exploded perspective view of the release device;

DETAILED DESCRIPTION

Figure 1A:
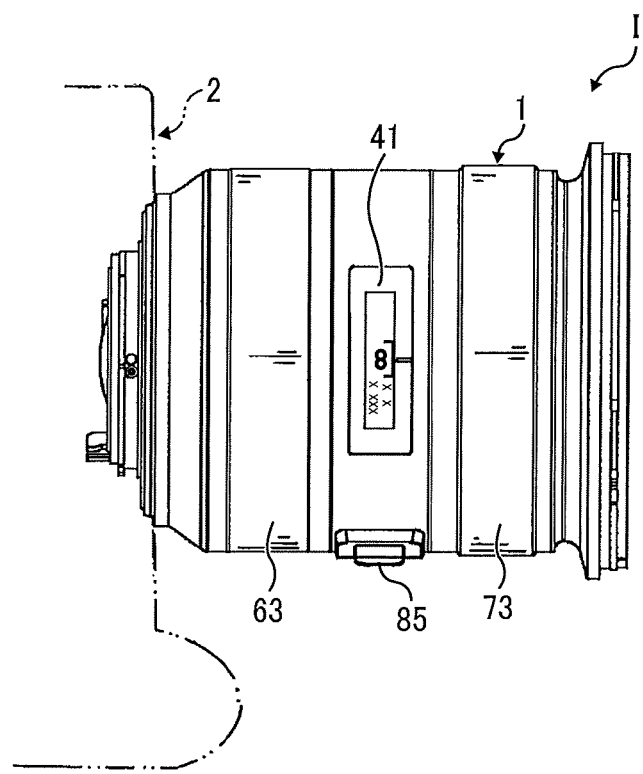
FIG. 1A is a top view of a lens barrel according to an embodiment of the present disclosure, used in an imaging device.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

In a type of lens barrel that includes an operation member used to switch between automatic focus (AF) and manual focus (MF), and a distance scale for checking the in-focus position, the operation member and the distance scale are arranged on the circumferential surface of the lens barrel side by side along the optical axis direction, which increases the length of the lens barrel in the optical axis direction. To avoid such an increase, a configuration according to a comparative example is proposed that includes the operation member and the distance scale arranged side by side in the circumferential direction, that is, these are positioned to overlap with each other in the optical axis direction of the lens barrel. In a lens barrel according to a comparative example, the distance scale and the operation member are disposed to overlap with each other in the optical axis direction of the lens barrel.

One of the examples of the operation member for switching between AF and MF is an electrical switch. As another example of the operation member, a code plate and a brush are used for switching between AF and MF. In this case, a switch member, a code plate and a brush are disposed inside the lens barrel of the operation member, which occupies a predetermined area in the direction around the optical axis. In view of the above, the present inventor has studied a configuration that employs the operation member used to directly move and control a movable member disposed inside of the lens barrel. This configuration, however, increases the area occupied by relevant members of the operation member.

In the configuration according to the comparative example, the distance scale is provided on an annular member that rotates in an operation of focusing the focusing operation, and rotates together with the annular member by a predetermined angle around the optical axis of the lens barrel during the focusing operation. Thus, in the lens barrel according to the comparative example having the distance scale and the operation member disposed overlapping with each other in the optical axis direction, the distance scale and the switch member or the like of the operation member might interfere with each other. Particularly, the operation member, which includes a portion to couple with the movable member, studied by the present inventor is more likely to increase in size as a whole. This configuration further increases the probability of the interference between the distance scale and the operation member. In order to avoid such an interference, the operation member is preferably spaced apart from the operation member in the direction around the optical axis. In this case, however, the operation member has to be arranged on the lower side of the lens barrel. This arrangement leads to a deterioration in the operability of the operation member.

In the comparative example, an auto-focus (AF)-manual focus (MF) switch operation member is disposed at a stepped place, so that the operation member and a ring member for rotating overlap with each other in the optical-axis direction, but do not overlap in the radial direction (that is, these members are radially shifted from each other), so as to avoid the interference between the operation member and a ring member configured to rotate. This configuration according to the comparative example, however, increases the outer-diameter size of the lens barrel, which hampers the reduction in size of the lens barrel.

In view of the above, the present inventor has conceived of a compact lens barrel with a reduced length in the optical-axis direction and the diameter direction, which increases the design flexibility of the arrangement position of the operation member to thereby enhance the operability of the operation member, and an imaging device including the lens barrel as described below.

First Embodiment

Figure 1B:
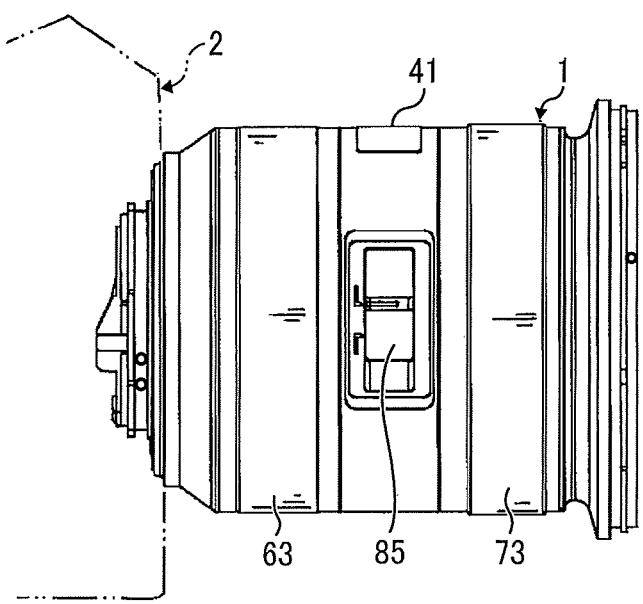
FIG. 1B is a left side view of the lens barrel of FIG. 1A.

FIGS. 1A and 1B are illustrations of a lens barrel 1 according to a first embodiment of the present disclosure attached to a camera body 2. FIG. 1A is a top view of the lens barrel 1, and FIG. 1B is a left side view of the lens barrel 1. In the front side of the lens barrel 1 (on the side of an object, the same applies hereinafter), a focus operation ring 73 is disposed on the circumferential surface of the lens barrel 1. The focus operation ring 73 enables manual focusing by the user's turning operation. A zoom operation ring 63 is disposed on the rear side (the image-plane side, the same applies hereinafter) on the circumferential surface of the lens barrel 1, and the user rotates the lens barrel 1 to change the focal length of the lens barrel 1.

On the left side surface of the lens barrel 1 as illustrated in FIG. 1B, a release switch 85 is disposed at an intermediate position of the lens barrel 1 in the direction of the optical axis of the lens barrel 1 (hereinafter, referred to simply as the optical-axis direction or the direction of the optical axis), that is, between the focus operation ring 73 and the zoom operation ring 63. The release switch 85 is described in detail later. The user's sliding the release switch 85 along the circumferential surface of the lens barrel 1 switches the manual focus (manual focus adjustment (MF)) mode of the focus operation ring 73 between an enabled state and a disabled state (released state). The release switch 85 serves as an operation section. When the manual focus mode is set to the released state, the manual focus adjustment of the focus operation ring 73 is disabled.

On the upper side surface of the lens barrel 1 as illustrated in FIG. 1A, a distance window 41 as a distance indication section (or simply referred to as a display section) is provided at a position adjacent to the release switch 85 in the circumferential direction. The user visually recognizes the distance indication through the distance window 41, so as to check the focusing distance that is a distance to the object of the lens barrel 1. The distance window 41 includes a distance display body 42 to be described later. The distance window 41 is disposed at a position that coincides with or partially overlaps the position of the release switch 85 in the direction of the optical axis. Such an arrangement of the distance window 41 that overlaps the release switch 85 in the direction of the optical axis achieves a reduction in the dimension of the lens barrel 1 in the direction of the optical axis, as compared to the configuration in which the distance window 41 does not overlap the release switch 85 in the direction of the optical axis.

Figure 2:
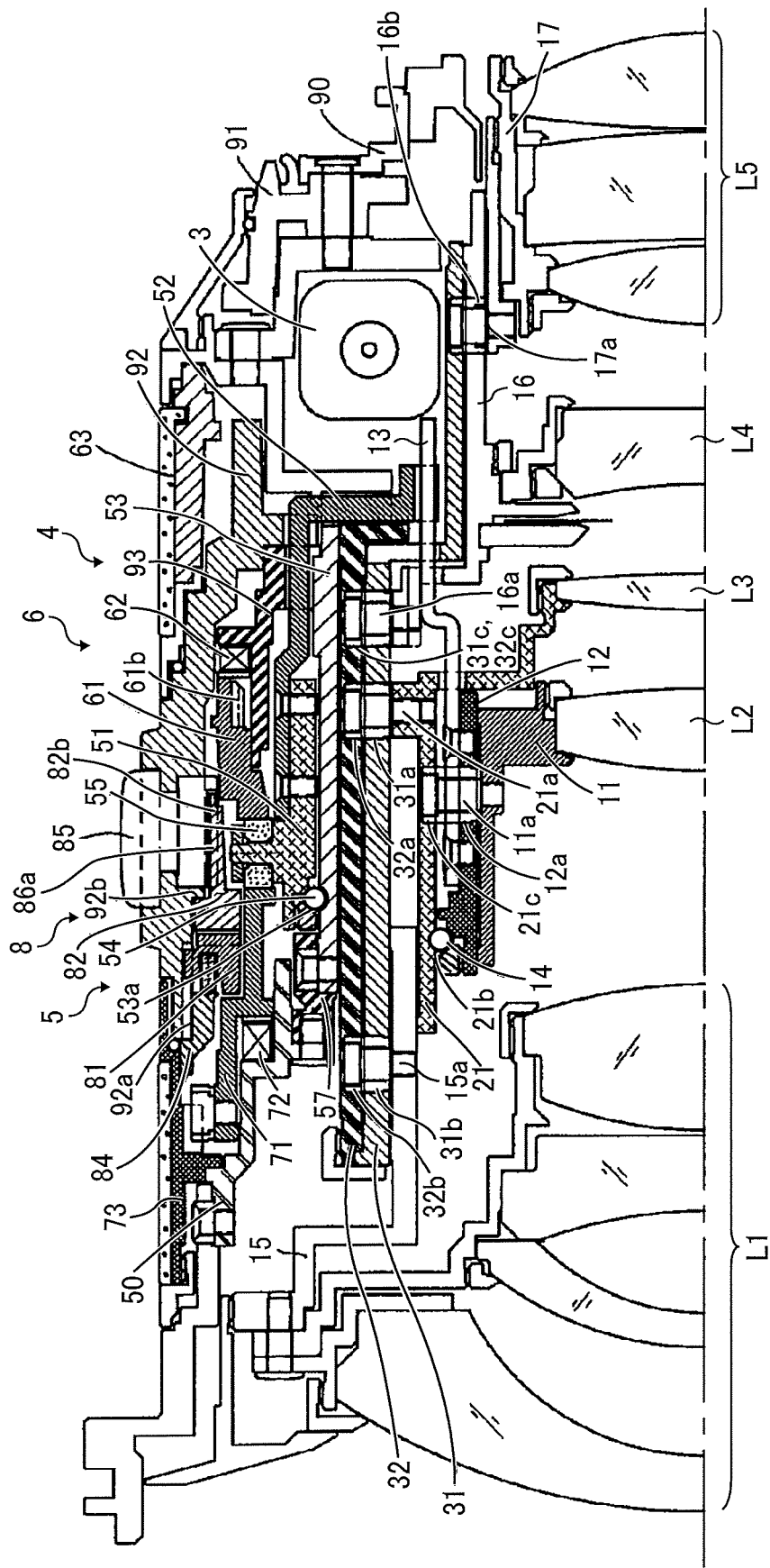
FIG. 2 is a longitudinal sectional view of a lens barrel according to a first embodiment along the optical axis direction of the lens barrel.
Figure 3:
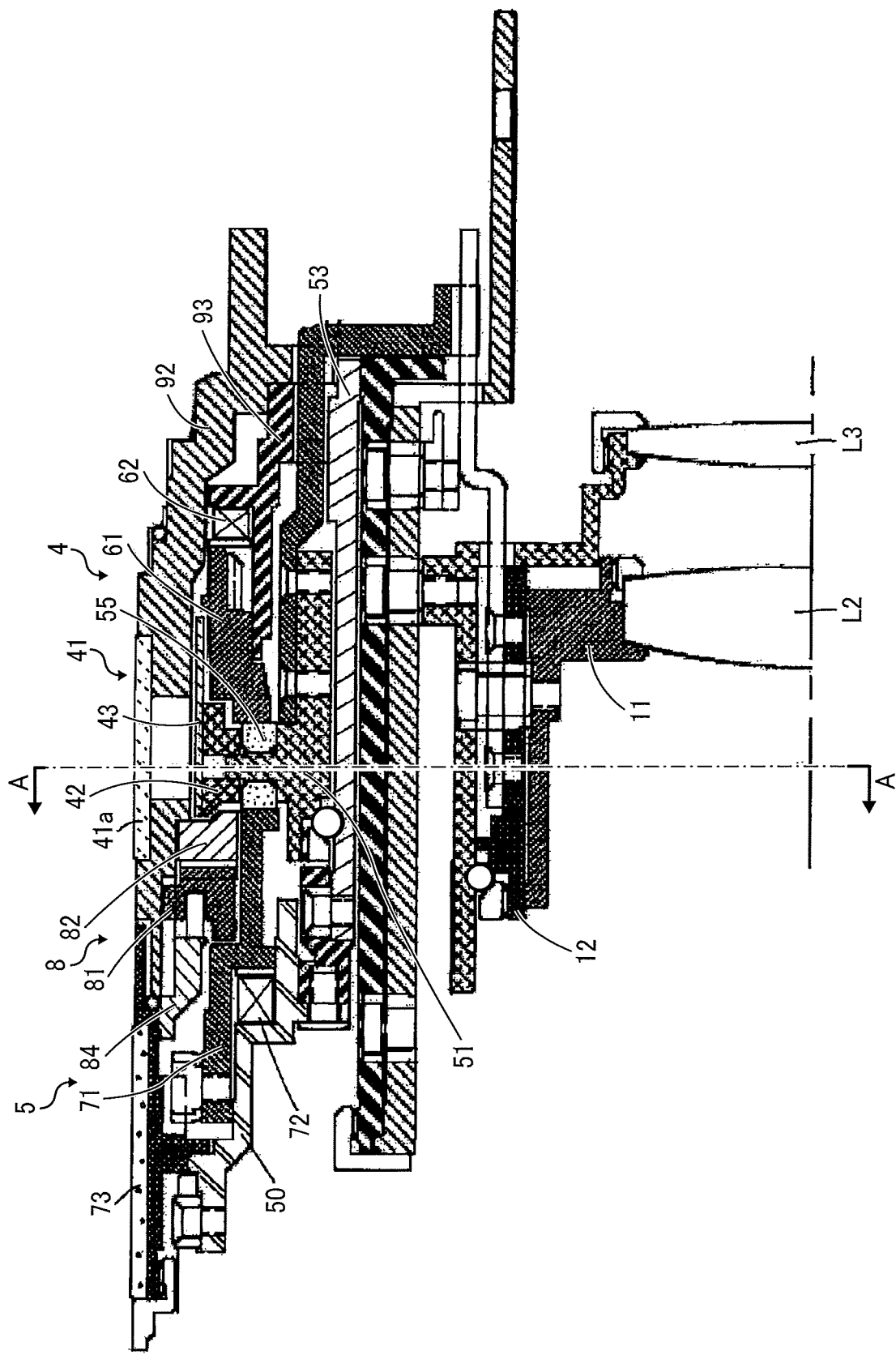
FIG. 3 is another longitudinal cross-sectional view of the lens barrel according to the first embodiment.

FIGS. 2 and 3 are longitudinal cross-sectional views of the lens barrel 1. FIG. 2 is a longitudinal cross-sectional view of the lens barrel 1 taken at a radial position that includes the release switch 85. FIG. 3 is a partial cross-sectional view of the lens barrel 1 taken at a position that includes the distance window 41. As illustrated in FIG. 2, the interior of the lens barrel 1 includes a first lens group L1, a second lens group L2, a third group lens L3, a fourth group lens L4, and a fifth group lens L5 arranged from the left side of FIG. 2, that is, from the object side of the lens barrel 1. The first lens group L1 to the fifth lens group L5 move in the direction of the optical axis of the lens barrel 1 to change the focal length of the lens barrel 1 when the zoom operation ring 63 is rotated. The second lens group L2 is configured as a focus lens for moving in the direction of the optical axis in zooming and focus adjustment.

A focus motor 3 is disposed near the image-plane side in the lens barrel 1. The rotation of the focus motor 3 is controlled by, for example, an automatic focus control device mounted in the camera body 2. The focus motor 3 when rotating moves the second group lens L2 in the optical-axis direction to perform automatic focus adjustment. The focus motor 3 constitutes a part of an actuator for automatic focus adjustment according to an embodiment of the present disclosure. In the present embodiment, a direct current (DC) motor is employed as the focus motor 3. However, no limitation is intended herein. The focus motor 3 is a brushless DC motor, a stepping motor, or an ultrasonic motor.

In the interior of the lens barrel 1, an automatic focus adjustment device 4 configured to be driven by the focus motor 3, a manual focus adjustment device 5 configured to be driven by the focus operation ring 73, and a differential device 6 that coordinates the automatic focus adjustment device 4 with the manual focus adjustment device 5. The differential device 6 allows the automatic focus adjustment device 4 to perform the automatic focus adjustment on the second lens group L2 during the rotation of the focus motor 3. Further, the differential device 6 allows the manual focus adjustment device 5 to perform the manual focus adjustment on the second lens group L2 during the manual operation of the focus operation ring 73. The releasing switch 85 attached to the differential device 6 intermittently connects (coordinates) the manual focus adjustment device 5 with the differential device 6. When the differential device 6 is disconnected with the manual focus adjustment device 5, i.e., the manual focus adjustment is set to the released status, the manual focus adjustment of the focus operation ring 73 is disabled.

The lens barrel 1 includes a first stationary ring 91 provided with a lens mount 90. The first stationary ring 91 is joined with a second stationary ring 92 and a third stationary ring 93 disposed on the inner-diameter side of the second stationary ring 92. The focus operation ring 73 and the zoom operation ring 63 are supported by the second stationary ring 92 and the third stationary ring 93, respectively.

The second stationary ring 93 has two openings penetrating through the second stationary ring 92 in the radial direction that are disposed at certain positions in the direction of the optical axis, on the left side surface and the upper side surface arranged side by side in the circumferential direction. As illustrated in FIG. 2, the release switch 85 is attached to one of the two openings. As illustrated in FIG. 3, the distance window 41 is attached to the other opening. The distance window 41 includes a waterproof and dustproof transparent plate 41a provided with, for example, an index for the user to check the distance indication. The transparent plate 41a is buried and fixed in a recess on the outer circumferential surface of the second stationary ring 92.

A rear support ring 53 is joined with the second stationary ring 92 at the inner diameter position of the second stationary ring 92, and a front support ring 50 is joined with the second stationary ring on the object side of the lens barrel 1. A second support ring 57 is coupled to a section where the front support ring 50 and the rear support ring 53 are joined together.

At the inner diameter position of the rear support ring 53, a straight ring 32 and a zoom cam ring 31 are concentrically arranged toward the inner diameter direction. At the inner diameter position of the zoom cam ring 31, a third group lens frame 21 holding the third group lens L3, a focus cam ring 12, and a second group lens frame 11 holding the second group lens L2 are concentrically arranged. A first group lens frame 15 is disposed at an inner diameter position on the object side of the zoom cam ring 31, and a fourth group lens frame 16 and a fifth group lens frame 17 are disposed at an inner diameter position on the image-plane side of the zoom cam ring 31.

The zoom cam ring 31 is provided with a cam groove 31a penetrating through the inner and outer diameters of the zoom cam ring 31. The straight ring 32 is provided with a longitudinal groove 32a extending in the optical-axis direction, and a roller (referred to also as cam follower) 21a provided on the outer periphery of the third group lens frame 21 is slidably fit into the cam groove 31a and the longitudinal groove 32a. Further, a roller 15a provided on the first group lens frame 15 is fit into a cam groove 31b and a longitudinal groove 32b provided in the zoom cam ring 31 and the straight ring 32. Similarly, a roller 16a provided on the fourth group lens frame 16 is fit into a groove 31c and a longitudinal groove 32c. Further, a roller 17 a provided on a fifth group lens frame 17 is fit into a longitudinal groove 16b provided in the fourth group lens frame 16.

Such a configuration allows the first group lens frame 15 and the third group lens frame 21 to move in the optical-axis direction with a rotation of the zoom cam ring 31 by the manual operation of the zoom operation ring 63, thereby moving the first group lens L1 and the third group lens L3. Further, with the rotation of the zoom cam ring 31, the first group lens frame 15, the fourth group lens frame 16, and the fifth group lens frame 17 move in the direction of the optical axis. With the rotation of these elements, the second group lens frame 11 also moves in the direction of the optical axis. As a result, the first group lens L1 through the fifth group lens L5 move, which changes the focal length of the lens barrel 1.

A circumferential groove 21b is provided on the inner peripheral surface of the third group lens frame 21. Between the circumferential groove 21b and the focus cam ring 12, a plurality of spheres 14 is circumferentially disposed in the circumferential groove 21b. This enables rotatably holding the focus cam ring 12 therein. The focus cam ring 12 has a cam groove 12a penetrating through the inner and outer diameters thereof. The third group lens frame 21 is provided with a longitudinal groove 21c extending in the optical axis direction. In addition, a roller 11a provided on the outer periphery of the second group lens frame 11 penetrating through the cam groove 12a is fit into the longitudinal groove 21c. This arrangement restricts the rotation direction of the second group lens frame 11 to the direction of the optical axis.

A focus lever 13 extending to the image-plane side in the optical-axis direction is fixed to the focus cam ring 12 with a screw. The focus lever 13 rotates upon receiving the output of the differential device 6, thereby rotating the focus cam ring 12 together with the focus lever 13 while advancing and retracting in the direction of the optical axis together with the focus cam ring 12.

Figure 4A:
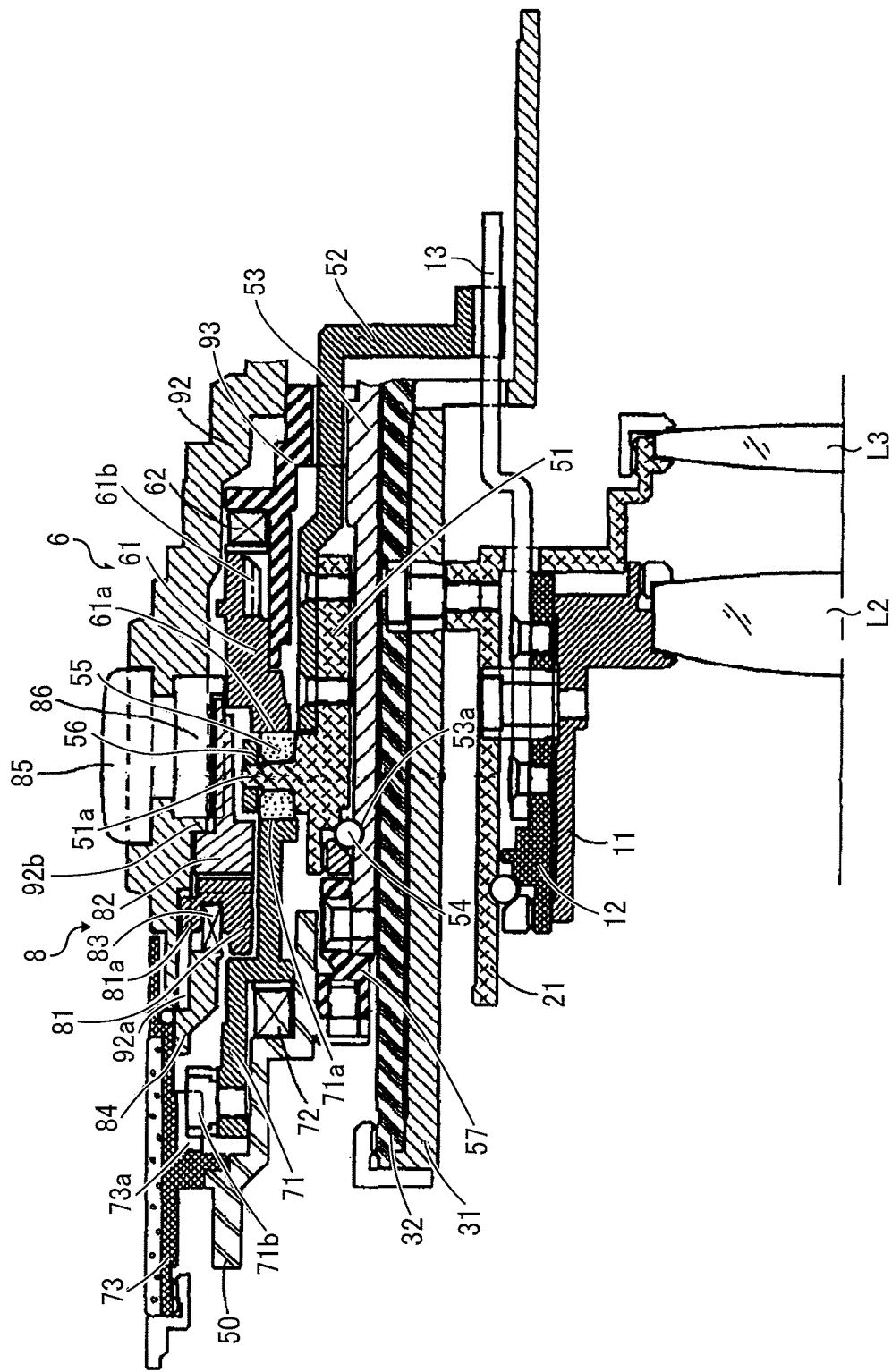
FIG. 4A is a longitudinal cross-sectional view of a release device and a differential device, which are in contact with each other.

FIG. 4A is a longitudinal sectional view of an area including the differential device 6, which is a part of the lens barrel 1 in FIG. 2. The differential device 6 is disposed in an area between the second stationary ring 92 and the straight ring 32 in the radial direction and in an area between the focus operation ring 73 and the focus motor 3 in FIG. 2 in the direction of the optical axis. The differential device 6 is constituted by a planetary device. That is, the differential device 6 has a configuration including a first solar vehicle and a second solar vehicle, a plurality of planets, and a planetary carrier supporting these planets.

An output ring 51 is disposed on the outer-diameter side of the rear support ring 53. A groove 53a that extends in the circumferential direction is provided on the outer circumferential surface of the rear support ring 53, and a plurality of spheres 54 arranged in the circumferential direction is disposed in the groove 53a between the outer circumferential surface of the rear support ring 53 and the output ring 51. With this arrangement, the output ring 51 does not move in the optical axis direction with respect to the rear support ring 53, and is rotatably held around the optical axis.

Figure 5:
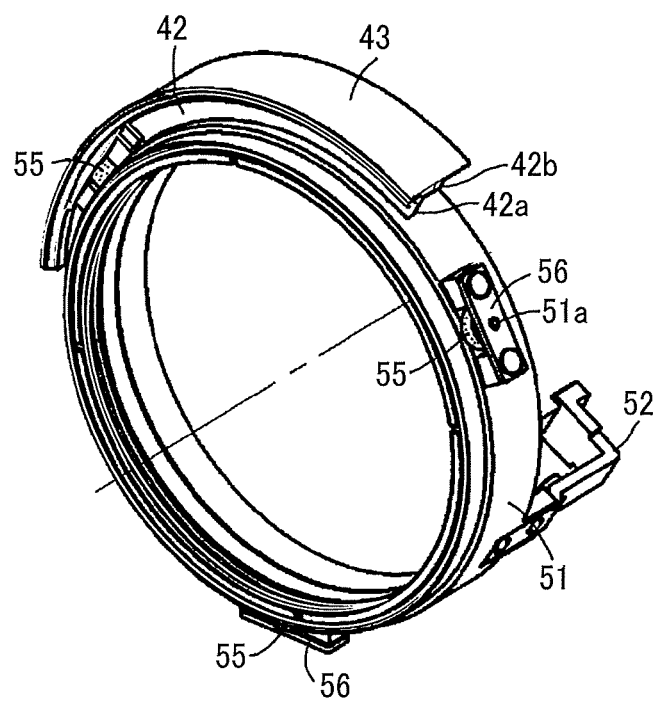
FIG. 5 is an external perspective view of an output ring.

FIG. 5 is an external perspective view of the output ring 51. An output lever 52 that extends in the direction of the optical axis is fixed to the output ring 51 with a screw, and has the leading end slidably fit with the focus lever 13. In this slide-fit configuration, the leading end of the output lever 52 is maintained integral with the focus lever 13 in the direction of rotation of the output ring 51, and the output lever 52 and the focus lever 13 slide over each other in the direction of the optical axis. In such a configuration, the rotation of the output ring 51 rotates the output lever 52, thereby rotating the focus lever 13, which further rotates the focus cam ring 12 that is integral with the focus lever 13. As described above, the rotation of the focus cam ring 12 advances or retracts the second group lens frame 11 in the direction of the optical axis to perform focus adjustment.

Three rotating shafts 51a extending in the outer-diameter direction are equally spaced on the outer-circumferential surface of the output ring 51 in the circumferential direction. A planetary roller 55 is loosely fit to each rotation shaft 51a. Each of two of the three rotating shafts 51a includes a cover 56 screwed to the output ring 51, which prevents the planetary roller 55 from coming out.

An arcuate distance display body 42 is screwed in an area in the circumferential direction that includes the remaining rotation shaft 51a and planetary roller 55. In the distance display body 42, a part of the inner edge in the circumferential direction is recessed in the outer-diameter direction, and screwed so as to serve also as the cover of the other rotation shaft 51a other than the above-described two rotating shafts 51a, which prevents the planetary roller 55 from coming out.

Figure 6A:
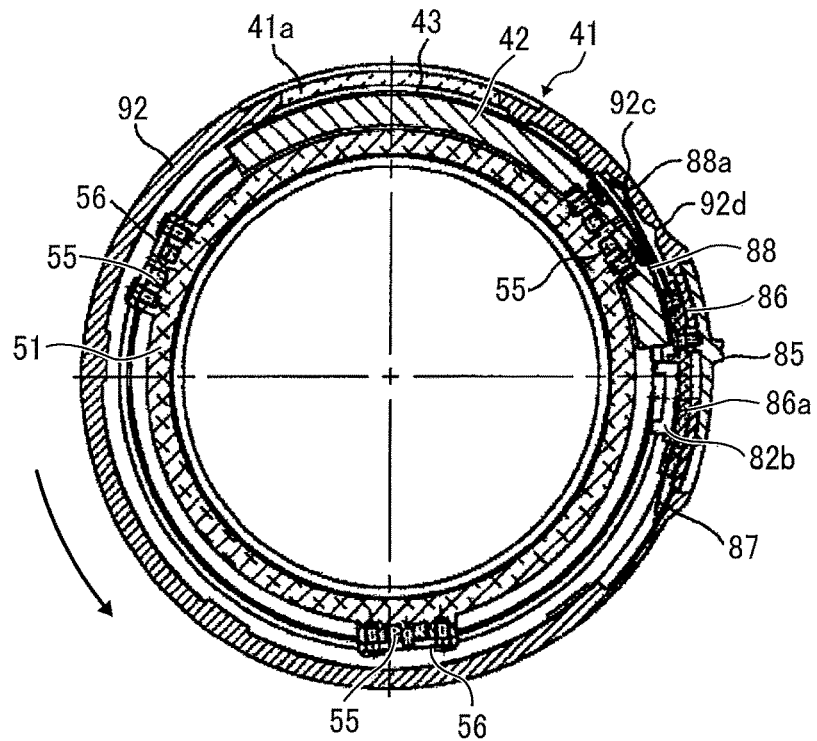
FIGS. 6A and 6B are cross-sectional views taken along line A-A of the lens barrel in FIG. 3 focused at infinity and the close end, respectively.

The distance display body 42 is formed in an arc shape having a substantially T-shaped cross section in the radial direction. The distance display body 42 has a lower edge 42a attached to the circumferential surface of the output ring 51 so that the circumferential surface 42b is formed to have an arcuate surface. Thus, the distance display body 42 radially projects from the circumferential surface of the output ring 51 in the outer-diameter direction by substantially the length of the lower edge 42a. The distance display body 42 is disposed within the space in the radial direction between the output ring 51 and the second stationary ring 92. FIG. 6A is a cross-sectional view of the lens barrel 1 taken along the line A-A in FIG. 3. The distance display body 42 is attached with a display plate 43 circularly curved on the circumferential surface 42b. The display plate 43 has a distance display body indicating the focal distance printed on the display plate 43, or a printed distance indication attached to the display plate 43. The distance indication of the display plate 43 is disposed facing the inner-diameter side of the distance window 41, which allows the user to visually recognize the distance indication from the outside of the lens barrel 1, through the transparent plate 41a as described above.

The circumferential length of each of the distance display body 42 and the display plate 43 is set to the length of the arc, the center angle of which is substantially equal to a rotation angle, at which the output ring 51 rotates between the infinite end and the closest end in focus adjustment. When the output ring 51 rotates in the lens barrel 1 and the distance display body 42 rotates together with the output ring 51, the distance display body 42 rotates within an area that ranges from the upper side surface to the right-side surface as viewed from the object side of the lens barrel 1. In this case, the distance display body 42 is configured not to move to the area in which at least the release switch 85 is disposed.

As illustrated in FIG. 4A, the lens barrel 1 includes a drive gear ring 61 and a drive ring 71 to sandwich the above-mentioned three planetary rollers 55 in the optical-axis direction. A second wave washer 62 is disposed between the drive gear ring 61 on the image-plane side and the third stationary ring 93 in the optical-axis direction. The second wave washer 62 biases the drive gear ring 61 toward the object side, which presses a slide face 61a on the object side of the drive gear ring 61 against the circumferential surface on the image-plane side of the planetary roller 55.

The lens barrel 1 further includes an internal gear 61b on image-plane-side end of the drive gear ring 61. The internal gear 61b is coupled to the focus motor 3 via a gear device. This configuration allows the drive gear ring 61 to rotate with the rotation of the focus motor 3. With the rotation of the drive gear ring 61, the planetary roller 55 pressed against by the drive gear ring 61 rotates, thereby rotating the output ring 51, thus rotating the focus cam ring 12, resulting in focus adjustment of the second group lens L2. Hence, the drive gear ring 61 constitutes a part of the above-described automatic focus adjustment device 4. Further, the drive gear ring 61 also constitutes one input section of the differential device 6.

The drive ring 71 contacting the planetary roller 55 on the object side of the planetary roller 55 has a slide face 71a on the image-plane-side edge that is opposed to the planetary roller 55 in the optical-axis direction. In addition, a first wave washer 72 is disposed between a stepped surface, which is provided in the middle of the drive ring 71, and the front support ring 50 in the direction of the optical axis. The first wave washer 72 biases the drive ring 71 toward the image-plane side in the optical-axis direction, which presses the slide face 71a against the object-side circumferential surface of the planetary roller 55.

A plurality of rollers 71b is arranged on the object-side outer circumference of the drive ring 71 in the circumferential direction of the drive ring 71, each roller 71b rising in the outer-radial direction. Further, each roller 71b is slidably fit into each of the plurality of longitudinal grooves 73a provided on the inner-circumferential surface of the focus operation ring 73 in the direction of the optical axis. This arrangement allows the drive ring 71 to move relative to the focus operation ring 73 along the direction of the optical axis. In addition, with the rollers 71b slidably fit into the longitudinal grooves 73a, the user's operation to rotate the focus operation ring 73 allows rotating the drive ring 71. When the slide face 71a is pressed against the planetary roller 55, the rotation of the drive ring 71 rotates the planetary roller 55, thereby rotating the output ring 51, thus rotating the focus cam ring 12, resulting in the focus adjustment of the second group lens L2. Hence, the drive ring 71 constitutes a part of the manual focus adjustment device 5. Further, the drive ring 71 also constitutes another input section of the differential device 6.

The following describes the operation of the differential device 6. In FIG. 4A, when the focus motor 3 is driven during the automatic focus adjustment, the drive gear ring 61 rotates and the drive force is transmitted to the planetary rollers 55 pressed against the slide face 61a. Accordingly, the planetary roller 55 rotates around the rotation shaft 51a of the output ring 51. At this time, the drive ring 71 on the object side is stationary without rotating due to the friction torque generated between the drive ring 71 and the first wave washer 72. Thus, the planetary roller 55 rotates around the rotation shaft 51a while the output ring 51 rotates around the optical axis. At this time, the output ring 51 rotates by a rotation amount of substantially half of that of the drive gear ring 61.

When the user operates the focus operation ring 73, the drive ring 71 rotates and the drive force is transmitted to the planetary roller 55 pressed against by the slide face 71a. Accordingly, the planetary roller 55 rotates around the rotation shaft 51a of the output ring 51. At this time, the drive gear ring 61 on the image-plane side is stationary without rotating due to the friction torque generated between the drive gear ring 61 and the second wave washer 62. Thus, the planetary roller 55 rotates around the rotation shaft 51a while the output ring 51 rotates around the optical axis.

In the differential device 6, the following relations are satisfied: rT1 is smaller than T2rT1; T2rT1 is smaller than T3T3; T3T3 is smaller than T2aT2; and T2aT2 is smaller than T3a where the rotational torque of the output ring 51 to move the second group lens L2 in the optical-axis direction is T1, the drive torque of the drive ring 71 rotated during the manual focus adjustment is T2, The drive torque of the drive gear ring 61 rotated during the focus adjustment is T3, the friction torque generated between the drive ring 71 and the first wave washer 72 is T2a, the friction torque generated between the drive gear ring 61 and the second wave washer 62 is T3a, and the speed reduction ratio of the differential device 6 is r.

The operation torque when the user operates the focus operation ring 73 depends on the static friction torque and dynamic friction torque generated between the drive ring 71 and the first wave washer 72. Preferably, the operation torque is not too heavy, not too light and moderate torque. A differential device according to a comparative example includes only one pressing member that gives friction torque. The pressing member in the comparative example corresponds to the second wave washer 62 according to the present embodiment of the present disclosure. Particularly when a vibration wave motor is employed as the actuator of the automatic focus adjusting device, the biasing force of a pressing member for biasing toward the planetary roller of the differential device is determined depending on the biasing force to allow the vibration wave motor to stably operate. This is because, a pressurizer for biasing toward a rotor serves also as the pressing member. In the differential device according to the comparative example, there is no degree of freedom in determining the biasing force of the pressing member, and adjusting the operation torque of the operation ring to an appropriate level has been difficult.

In the first embodiment, the drive ring 71 and the drive gear ring 61 are biased by the first wave washer 72 and the second wave washer 62, respectively, which allows adjusting the biasing forces independently. Within the range that satisfies the relations of T1, T2, T3, T2a, and T3a, setting the biasing force of, for example, the first wave washer 72 to be low allows reducing the operation torque of the focus operation ring 73.

As described above, the rotation of the output ring 51 rotates the output lever 52 integrated with the output ring 51, thereby rotating the focus lever 13, which further rotates the focus cam ring 12 that is integral with the focus lever 13. Such a rotation of the focus cam ring 12 advances or retracts the second group lens frame 11 to perform the focus adjustment. In such a state illustrated in FIG. 4A, both the automatic focus adjustment and the manual focus adjustment are enabled. Accordingly, when the user operates the focus operation ring 73 in focus adjustment by the automatic focus adjustment, the differential device 6 rotates the output ring 51.

A description is given of a release device 8 for preventing the movement of the differential device 6 by the operation of the focus operation ring 73 during the automatic focus adjustment. FIG. 7 is a partially exploded perspective view of the releasing device 8. The drive ring 71 includes the release member 81 at the outer diameter position of the drive ring 71. The drive ring 71 further includes a release switch ring 82 on the image-plane side and a presser ring 84 on the object side in the direction of the optical axis, between which the release member 81 is disposed. Note that the release switch ring 82 is disposed at the position along the optical axis to encircle the output ring 51.

The release switch ring 82 is rotatably held at the inner-diameter position of the second stationary ring 92. A plurality of (six release cams in the present embodiment) release cams 82a is formed in the circumferential direction on the surface of the release switch ring 82 that faces the release member 81, that is, the object-side surface of the release switch ring 82 in the axial direction. The release switch ring 82 includes an engagement key 82b extending rearward (to the image-plane side). The release switch ring 82 is engaged with an engagement groove 86a of a release switch attachment member 86 that supports the release switch 85. With this configuration, the release switch ring 82 is coupled to the release switch 85, and rotates around the optical axis in response to the user's operation of the release switch 85 in the circumferential direction.

The release member 81 is provided with three straight keys 81a, each being oriented in the optical-axis direction in the circumferential direction on the outer circumferential surface of the release member 81. Each straight key 81a is slidably fit into a longitudinal groove 92a on the inner-circumferential surface of the second stationary ring 92. This arrangement restricts the rotation of the release member 81 around the optical axis in the interior of the second stationary ring 92 while holding the release member 81 to be capable of moving straight. The release member 81 is provided with an engagement projection 81b opposed to the release cam 82a of the release switch ring 82 in the optical-axis direction. Further, the release member 81 includes a rib 8 over the object-side surface in the optical-axis direction, the rib 8 facing the stepped surface oriented to the image-plane side along the optical-axis direction on the drive ring 71.

The presser ring 84 is fixed to the front-side part of the second stationary ring 92 with, for example, a screw. A plurality of (six compression coil springs in the embodiment) compression coil springs 83 is disposed between the presser ring 84 and the release member 81 in the circumferential direction, which provides a spring force to bias the release member 81 toward the image-plane side in the optical-axis direction. This biasing of the release member 81 causes the engagement projection 81b of the release member 81 to contact the release cam 82a of the release switch ring 82, thereby pressing the release switch ring 82. The release switch ring 82 is held between the release member 81 and a plurality of presser ribs 92b provided on the inner-circumferential surface of the second stationary ring 92.

The release switch attachment member 86 is formed to be a curved plate, and includes a conductive brush 87 and a plate spring 88 attached thereto. The conductive brush 87 and the plate spring 88 are disposed within the plate thickness of the release switch attachment member 86 as viewed in the radial direction of the lens barrel 1. The conductive brush 87 is brought into electrical contact with a flexible printed circuit board disposed in the lens barrel 1, to detect the rotational position of the release switch 85. Further, the plate spring 88 is configured to transmits, to the user having operated the release switch 85, the switching behavior of the release switch 85. The plate spring 88 has a bent-tip section 88a that moves along the inner-circumferential surface of the second stationary ring 92, and slides to fit into valleys 92c and 92d formed in the inner-circumferential surface of the second stationary ring 92. This provides the switching behavior as a click feeling to the user. An engagement groove 86a surrounded by a U-shaped projecting wall that projects in the radial direction is formed in a part of the inner surface of the release switch attachment member 86. The engagement key 82b of the release switch ring 82 is engaged with the engagement groove 86a. This configuration couples the release switch 85 with the release switch ring 82.

Figure 4B:
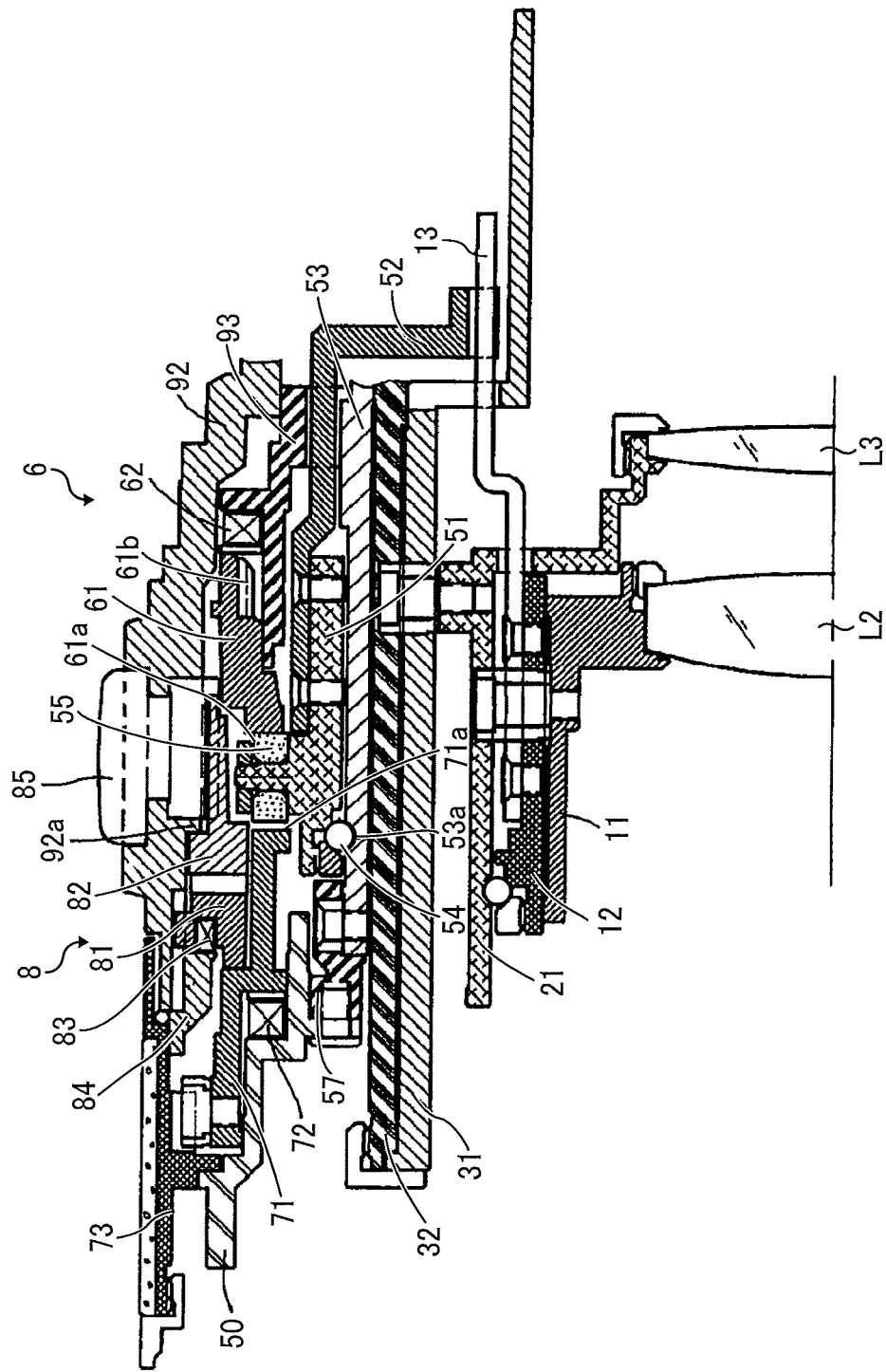
FIG. 4B is a longitudinal sectional view of the release device and the differential device, which are separated from each other.
Figure 8A:
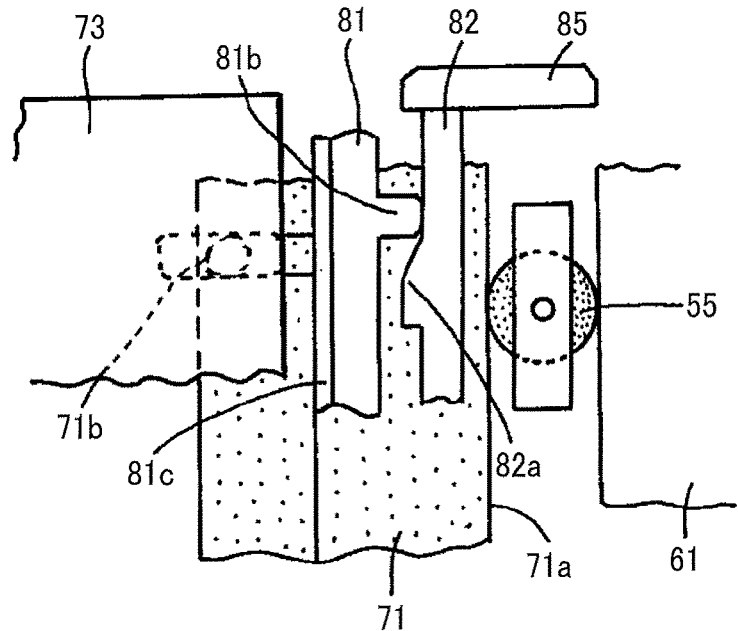
FIGS. 8A and 8B are illustrations of an operation of the release device.
Figure 8B:
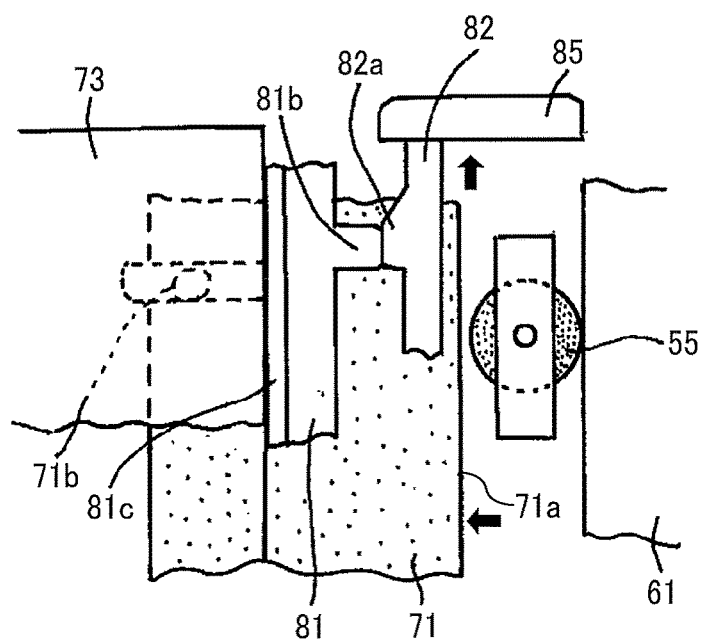

A description is given of the operation of the release device 8 with reference to FIGS. 7, 8A, and 8B. FIG. 7 is a schematic illustration of the release device 8 virtually viewed from above the lens barrel 1. FIGS. 8A and 8B corresponds to FIGS. 4A and 4B, respectively.

When the release member 81 is slid upward in the lens barrel 1 by the user's operation of the release switch 85 as illustrated in FIG. 8A, the bent-tip section 88a of the plate spring 88 is engaged with the valley 92c formed on the inner-circumferential surface of the second stationary ring 92. In this state, the manual focus adjustment is enabled. At this time, the conductive brush 87 is capable of detecting the operation position.

In other words, as illustrated in FIG. 8A, when the release switch 85 is operated by the user to a position that enables the manual focus adjustment, the release switch ring 82 is rotated to a position at which the release cam 82a do not contact the engagement projection 81b. Accordingly, the release member 81 is moved to the image-plane side by the biasing force of the compression coil spring 83, and the rib 81c of the release member 81 is separated from the stepped surface of the drive ring 71. Thus, the slide face 71a of the drive ring 71 is pressed against the planetary roller 55 by the biasing force of the first wave washer 71 as illustrated in FIG. 4A. The user's operation of the focus operation ring 73 rotates the output ring 51, which enables the manual focus adjustment.

To cancel the state of the manual focus adjustment mode, the user operates the release switch 85 to slide in the clockwise direction, that is, downward in the lens barrel 1 from the state as illustrated in FIG. 6A, so that the bent-tip section 88a of the plate spring 88 reaches the position of the valley 92d. As illustrated in FIG. 8B, when the release switch 85 is operated by the user to a position that cancels the manual focus adjustment mode, the release switch ring 82 is rotated to a position at which the release cam 82a contacts the engagement projection 81b. Accordingly, the release member 81 is moved to the object side by the biasing force of the compression coil spring 83, and the rib 81c of the release member 81 contacts the stepped surface of the drive ring 71. As a result, the drive ring 71 is moved to the object side against the biasing force of the first wave washer 71, and the slide face 71a of the drive ring 71 is separated from the planetary roller 55. In this state, the output ring 51 does not rotate even with the user's operation of the focus operation ring 73, which disables the manual focus adjustment.

When the conductive brush 87 detects that the release switch 85 has been operated to reach the cancel position, the power supply to the focus motor 3 is cut off in a control circuit so as to prohibit focus adjustment by the automatic focus adjustment.

In the first embodiment, the user's operation of the release switch 85 in the circumferential direction of the lens barrel 1 enables operating the focus operation ring 73 or release this state. This configuration increases the operability of the release switch 85 during the imaging while stably holding the imaging device I during the operation, as compared to the case in which the release switch 85 is operated along the direction of the optical axis.

To release the manual focus adjustment mode in the first embodiment, the configuration is provided that the release member 81 pushes the drive ring 71 to release the coupling of the drive ring 71 with the planetary roller 55. This configuration enables releasing the manual focus adjustment mode at any position regardless of the rotational position of the ring 73 while preventing the misalignment of the focal position due to the small rotation of the focus operation ring 73. Further, such a configuration reliably prevents the misalignment of the focal position because there is no loose fit with play caused by component tolerance.

In releasing the manual focus adjustment mode according to the first embodiment, the drive ring 71 is moved to the object side, which compresses the first wave washer 72 further, so that the elastic restoring force of the first wave washer 72 increases. Accordingly, the rotation torque for operating the focus operation ring 73 increases, which facilitates a user's intuitive perceiving of the release of the manual focus adjustment mode.

When the manual focus adjustment mode is released, the planetary roller 55 of the output ring 51 is pressed against the slide face 61a of the drive gear ring 61 for automatic focus adjustment. This arrangement prevents an improper rotation of the output ring 51 even when vibrations or the like are applied to the lens barrel 1 at the time of the release. Thus, the misalignment of the focal position is reliably prevented.

As described above, the user's operation of the release switch 85 rotates the release switch ring 82, which moves the release member 81 in the direction of the optical axis, thus releasing the connection of the manual focus adjustment device 5 in the differential device 6. Accordingly, the release switch 85 and the release switch attachment member 86 supporting the release switch 85 constitute an operation section that operates the release device 8 for controlling the connection and release in the differential device 6, that is, a switch that switches the released state. That is, the release switch 85 serves as the operation section to control movable devices of the lens barrel 1 that includes the release switch attachment member 86, the conductive brush 87 and the plate spring 88 attached to the release switch 85, the release device 8, and the differential device 6 to be controlled with the release device 8.

As can be seen from FIG. 1A, the release switch 85 of the operation section is disposed on the circumferential surface of the second stationary ring 92. Similarly, the distance window 41 as the distance display section is also disposed on the circumferential surface of the second stationary ring 92. In particular, the release switch 85 is disposed at a position close to the distance window 41 and on the left-side surface of the lens barrel 1 at which the user can easily operate the release switch 85. Further, as can be seen from FIG. 6A, the release switch attachment member 86 of the operation section is provided with a coupling section at which the release switch attachment member 86 is coupled with a the circumferential-directional part of the release switch ring 82. That is, the coupling section is the engagement groove 86*a* that engages with the engagement key 82*b*. The engagement groove 86*a* is disposed within a space in the radial direction between the outer-circumferential surface of the output ring 51 of the differential device 6 and the inner-circumferential surface of the second stationary ring 92. Within the space, the distance display body 42 of the distance display section and the display plate 43 are also arranged.

That is, the engagement groove 86*a* as the coupling section of the operation section coupled with the release device 8 and the distance display body 42 of the distance display section overlap with each other in the radial direction of the lens barrel 1. In other words, the distance display section including the distance display body 42 and the coupling section (the engagement groove 86*a*) of the release switch attachment member 86 of the operation section (the release switch 85) that is mechanically coupled with the release device 8 as a part of the movable device in the interior of the lens barrel 1 are disposed to overlap with each other in the radial direction. Other elements other than the coupling section in the release switch attachment member 86 are disposed away from the distance display body 42 in the radial direction, that is, disposed on the outer-diameter side of the distance display body 42.

With such a configuration of the operation section (the release switch 85), when the lens barrel 1 is focused on infinity, the output ring 51 rotates by a maximum amount in the clockwise direction, and the display plate 43 indicating the infinity on the distance display body 42 is visually recognized by the user through the distance window 41, as illustrated in FIG. 6A. At this time, the clockwise-directional end of the distance display body 42 overlaps a part of the release switch attachment member 86 in the circumferential direction, and is not moved to the position of the coupling section (the engagement groove 86*a*), which prevents the interference between the distance display body 42 and the release switch attachment member 86.

Figure 6B:
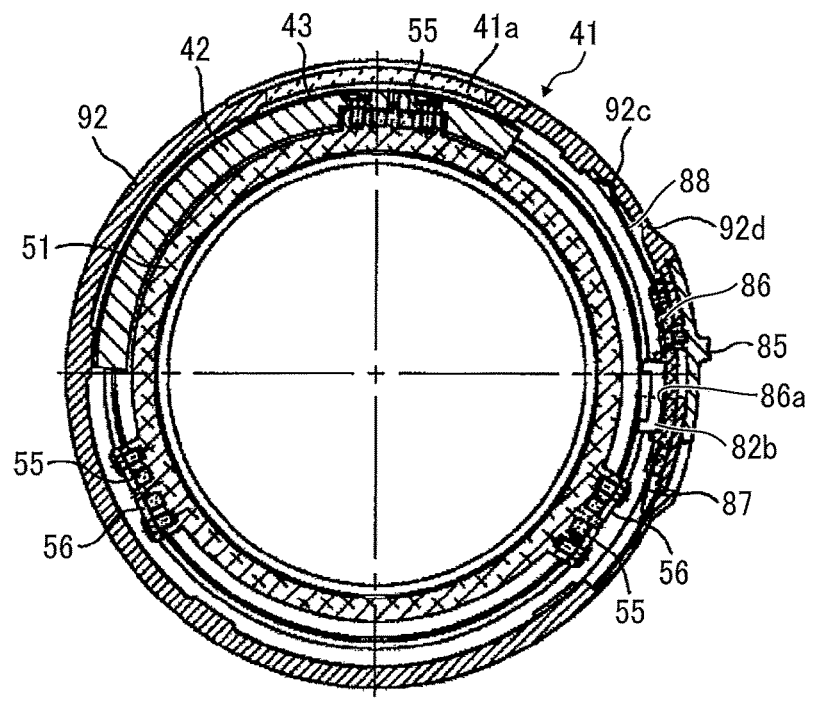

FIG. 6B is a sectional view of the lens barrel 1 that is focused at the close end. In this case, the output ring 51 rotates by a maximum amount in the counterclockwise direction, and the distance display body 42 indicating the close distance is visually recognized by the user through the distance window 41. At this time, the distance display body 42 is moved in a direction away from the release switch attachment member 86, which prevents the interference between the distance display body 42 and the release switch attachment member 86. In this case, one planetary roller 55, which moves toward the release switch 85 in the clockwise direction, does not reach the release switch attachment member 86. In the configuration according to the first embodiment, even when the output ring 51 is rotated to perform focusing of the lens barrel 1 from infinity to the close end, the output ring 51, the distance display body 42 and the planetary rollers 55 mounted on the output ring 51 do not interfere with the release switch attachment member 86.

In this configuration, the distance display section and the operation section (the release switch 85) are disposed on the circumferential surface of the lens barrel 1 to overlap with each other along the direction of the optical axis, which allows a reduction in the length of the lens barrel 1 in the direction of the optical axis. Further, in this configuration, the distance display body 42 of the distance display section and the coupling section (the engagement groove 86*a*) of the release switch attachment member S6 are disposed to overlap with each other in the radial direction of the lens barrel 1. This arrangement prevents the interference between the distance display body 42 and the release switch attachment member 86 even with a predetermined amount of rotation (movement) of the distance display body 42 while providing the release switch 85 disposed close to the distance window 41, thus increasing the operability of the release switch 85, as compared to the case in which the distance display body 42 overlaps with the release switch attachment member 86 as a whole in the radial direction of the lens barrel 1. Even with the movement of the distance display body 42, a thin area other than the area of the coupling section (the engagement groove 86*a*) of the release switch attachment member 86 merely comes to overlap the distance display body 42 in the circumferential direction, thereby preventing an increase in the outer diameter dimension of the lens barrel 1. This configuration achieves a compact lens barrel with an operation member having an increased operability while providing a compact imaging device, such as a camera, with such a lens barrel.

The present disclosure is applied to any lens barrel that includes a distance display section and an operation section for operating movable members disposed within the lens barrel. Accordingly, the present disclosure is applicable to lens barrels according to a second embodiment and a third embodiment as described below.

Second Embodiment

Figure 9A:
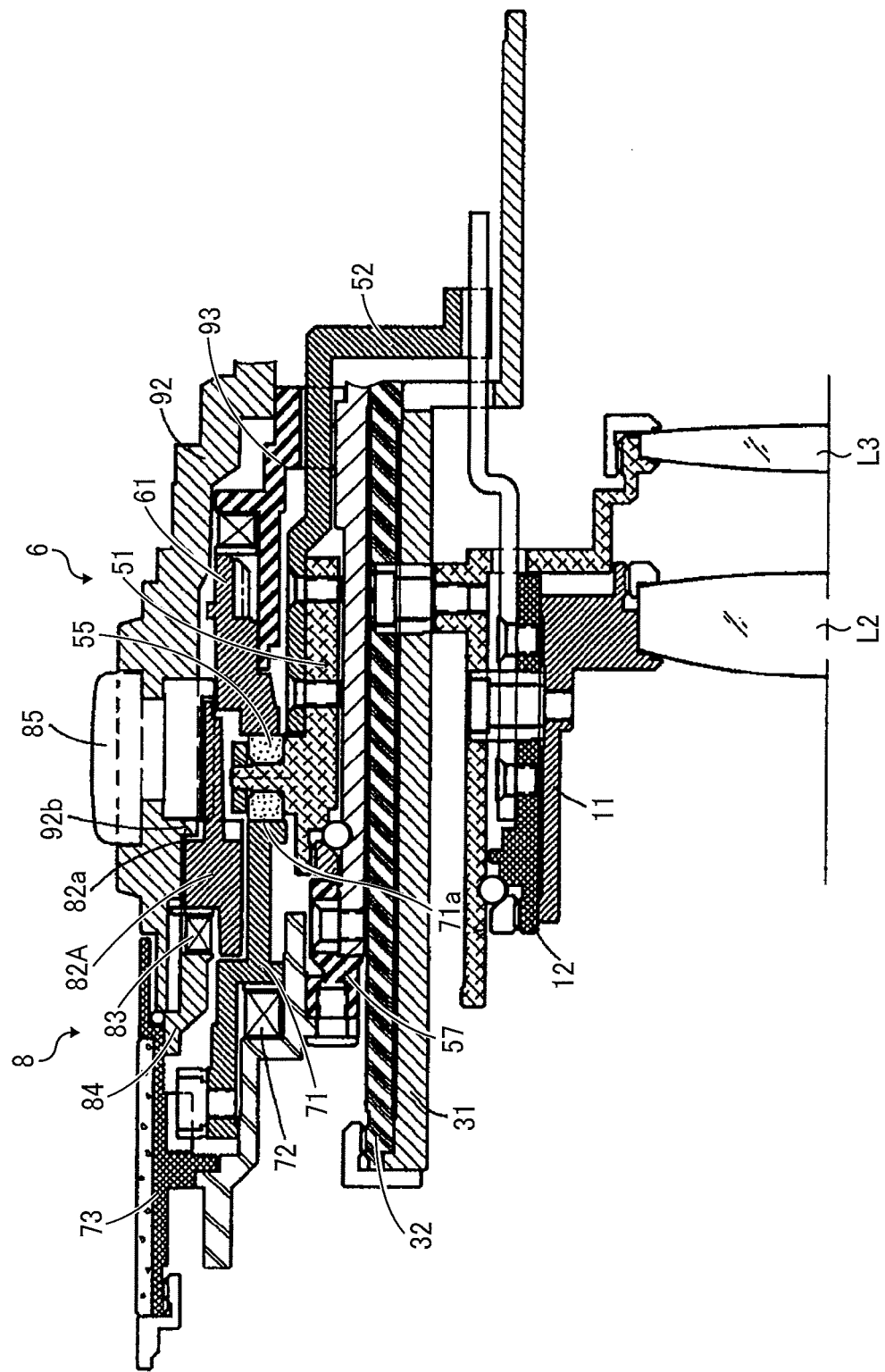
FIG. 9A is a longitudinal cross-sectional view of a lens barrel according to a second embodiment with a release device in contact with a differential device.
Figure 10:
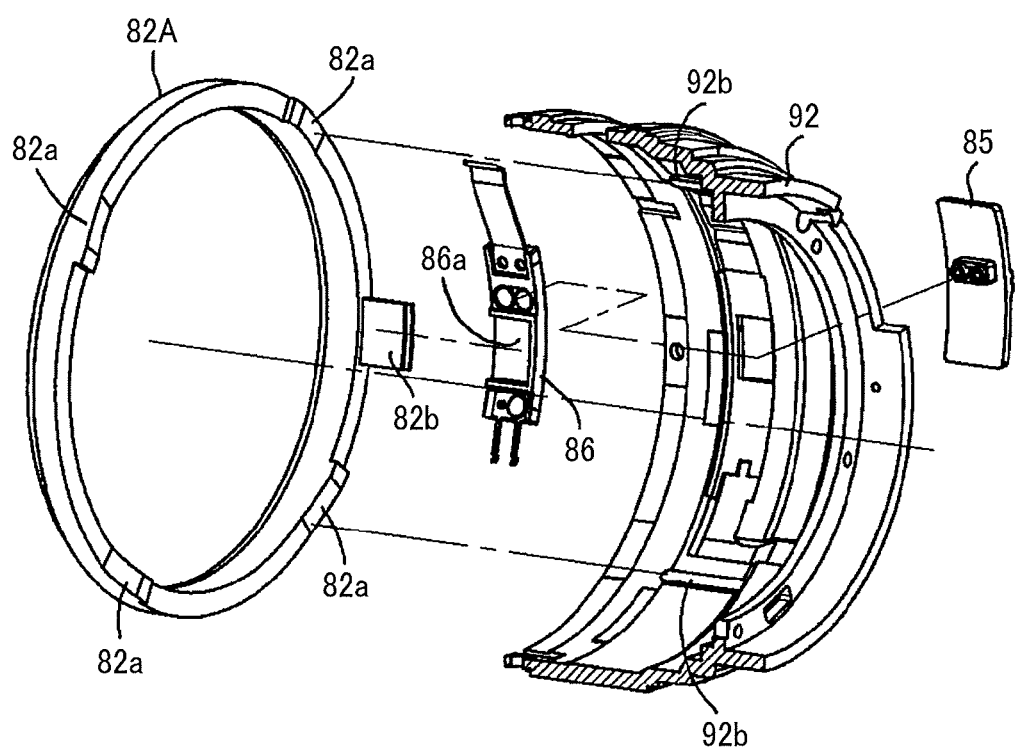
FIG. 10 is a partially-exploded perspective view of the release device according to the second embodiment.

FIG. 9A is a cross-sectional view of a release switch ring member 82A according to a second embodiment formed by the release switch ring 82 integrated with the release member 81 according to the first embodiment. Parts equivalent to those in the first embodiment are denoted by the same reference numerals, and redundant description is omitted. FIG. 10 is a perspective view of the release switch ring member 82A. In the second embodiment, as illustrated in FIG. 10, the release switch ring member 82A includes a tapered release cam 82*a* provided on the image-plane side surface of the release switch ring member 82A. The second stationary ring 92 has the surface directed to the direction of the optical axis including an engagement projection 92*b* that faces the release cam 82*a* in the direction of the optical axis. The release cam 82*a* comes to engage with or gets released from the engagement projection 92*b* with changes in rotational position of the release switch ring member 82A. The release switch ring member 82A is mounted at the inner-radial position of the second stationary ring 92 to be capable of slightly moving in the direction of the optical axis. Further, the release switch ring member 82A is biased toward the image-plane side by the compression coil spring 83 disposed between the release switch ring member 82A and the presser ring 84. In some embodiments, the compression coil spring 83 is a third wave washer. With such a configuration, the release cam 82*a* is biased toward a direction to contact the engagement projection 92*b*.

In the second embodiment, when the release switch 85 is operated in the circumferential direction, as illustrated in FIG. 9A, the release switch ring member 82A rotates in the circumferential direction, which causes the release cam 82*a* to contact the engagement projection 92*b* or not to contact the engagement projection 92*b*. When the release cam 82*a* does not contact the engagement projection 92*b*, the biasing force of the compression coil spring 83 moves the release switch ring member 82A to the image-plane side of the imaging device I. That is, the release switch ring member 82A is at the position on the image-plane side when the release cam 82*a* is not contact with the engagement projection 92b. Further, the first wave washer 72 presses the drive ring 71 toward the image-plane side of the imaging device I, thereby pressing the slide face 71a of the drive ring 71 against the planetary roller 55. In this state, the user's operation of the focus operation ring 73 rotates the output ring 51, thus allowing the manual focus adjustment.

Figure 9B:
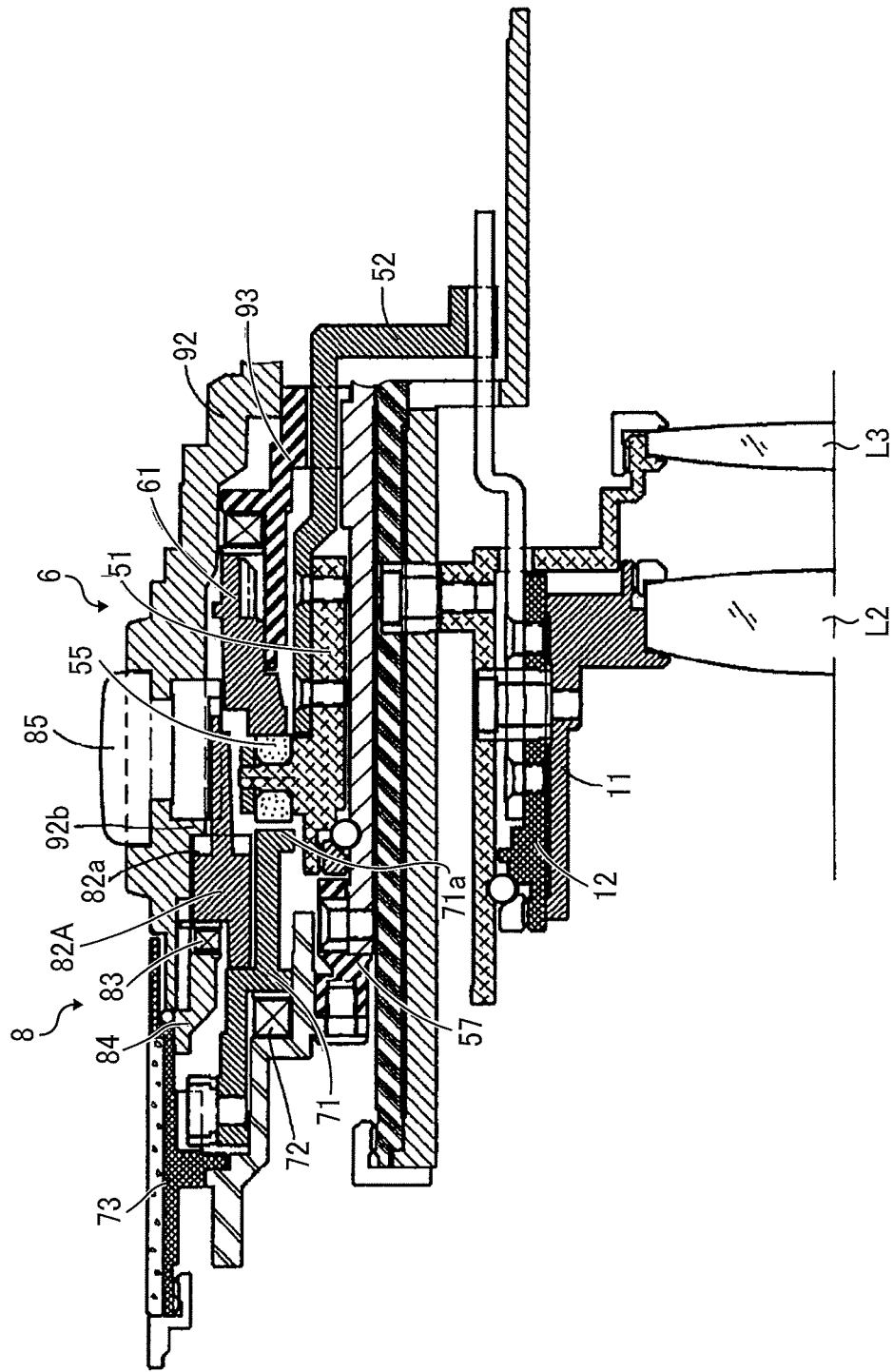
FIG. 9B is a longitudinal sectional view of the lens barrel according to the second embodiment with the release device separated from the differential device.

By contrast, when the release cam 82a contacts the engagement projection 92b in accordance with the operation of the release switch 85, as illustrated in FIG. 9B, the release switch ring member 82A moves toward the object side of the imaging device I, against the biasing force of the compression coil spring 83, thereby moving the drive ring 71 to the object side. As a result, the slide face 71a of the drive ring 71 is separated from the planetary rollers 55, and thus the manual focus adjustment mode is set to the released state. Thus, even with the user's operation of the focus operation ring 73, the output ring 51 does not rotate and the manual focus adjustment is disabled.

In the second embodiment, using one release switch ring member 82A enables connecting and disconnecting the drive ring 71 with the differential device 6 by moving the drive ring 71 along the direction of the optical axis. This configuration reduces the number of elements in the lens barrel 1, thus advantageously reducing the size of the lens barrel 1. In the configuration according to the second embodiment, similarly to the first embodiment, the operation section including the release switch is provided to overlap the distance display section including the distance window and the distance display body in the direction of the optical axis and in the radial direction. This arrangement achieves a reduction in size of the lens barrel.

Third Embodiment

Figure 11A:
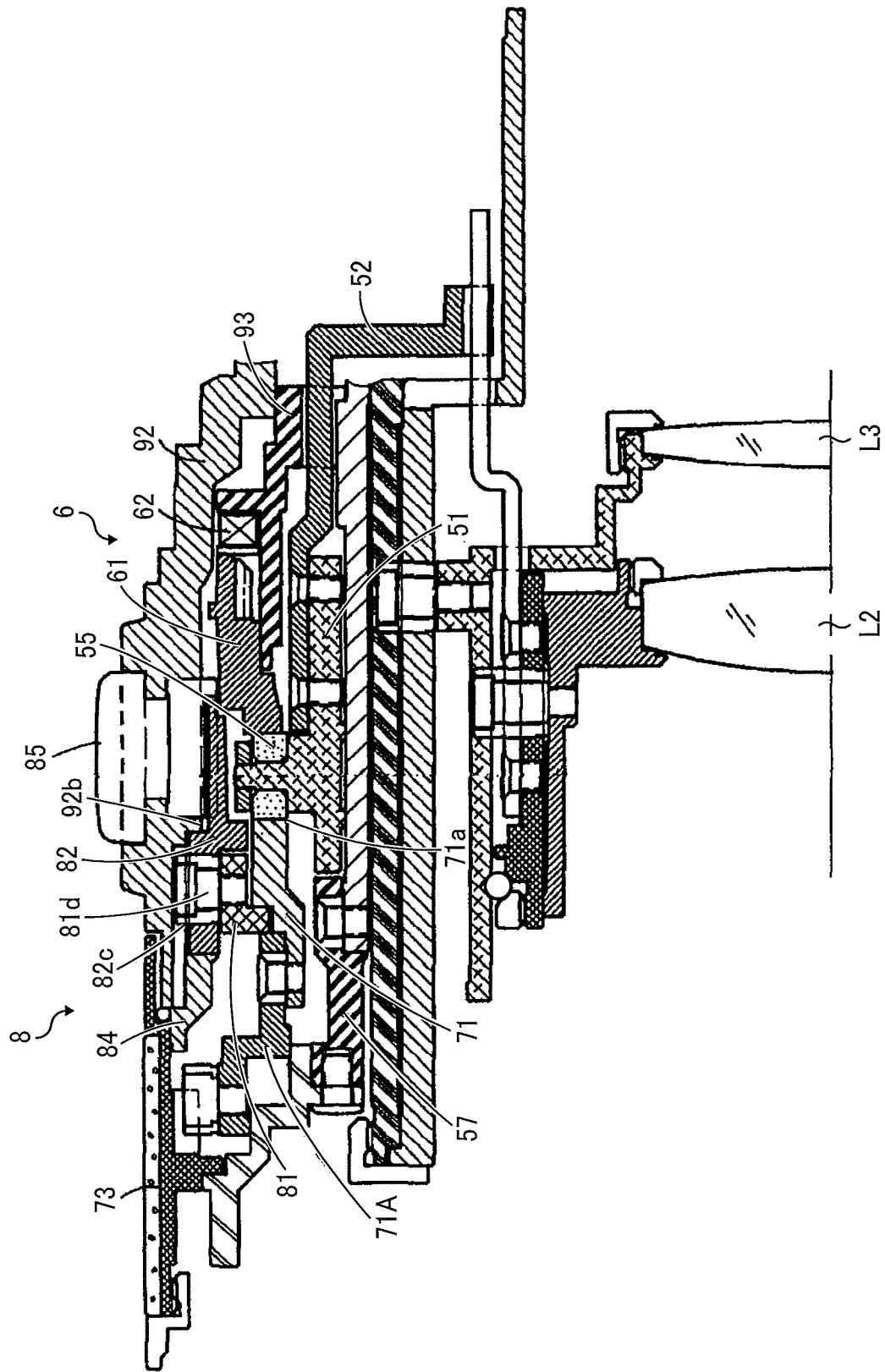
FIG. 11A is a longitudinal cross-sectional view of a lens barrel according to a third embodiment with a release device in contact with a differential device.

FIG. 11A is a cross-sectional view of the release switch ring 82 and the release member 81 according to a third embodiment in which these are configured in a cam groove structure. Parts equivalent to those in the first embodiment are denoted by the same reference numerals, and redundant description is omitted. In the third embodiment, the release switch ring 82 is formed in a cylindrical shape and a cam groove 82c is provided on the circumferential surface of the release switch ring 82. The release member 81 is disposed on the inner-diameter side of the release switch ring 82, and a roller 81d engaging with the cam groove 82c is disposed in a part of the release switch ring 82. Further, an auxiliary drive ring 71A is coupled with the drive ring 71 in the optical-axis direction, with a screw. A part of the release member 81 is sandwiched between the drive ring 71 and the auxiliary drive ring 71A in the optical-axis direction. The slide face 71a on the image-plane side of the drive ring 71 is disposed facing the planetary roller 55, and the auxiliary drive ring 71A is engaged with the focus operation ring 73. Note that the first wave washer 72 in the first embodiment is not included in the lens barrel 1 according to the third embodiment.

In Embodiment 3, operating the release switch 85 to rotate the release switch ring 82 moves the release member 81 toward the image-plane side in the optical-axis direction, which is caused by the sliding of the cam groove 82c and the roller 81d as illustrated in FIG. 11A. As a result, the drive ring 71 and the auxiliary drive ring 71A that sandwich the release member 81 also move toward the image-plane side. Thus, by suitably designing the shape of the cam groove 82c, when the release switch 85 is operated to a position where manual focus adjustment is enabled, the drive ring 71 moves toward the image-plane side and the slide face 71a comes into contact with the planetary roller 55, thus enabling the manual focus adjustment with the focus operation ring 73.

Figure 11B:
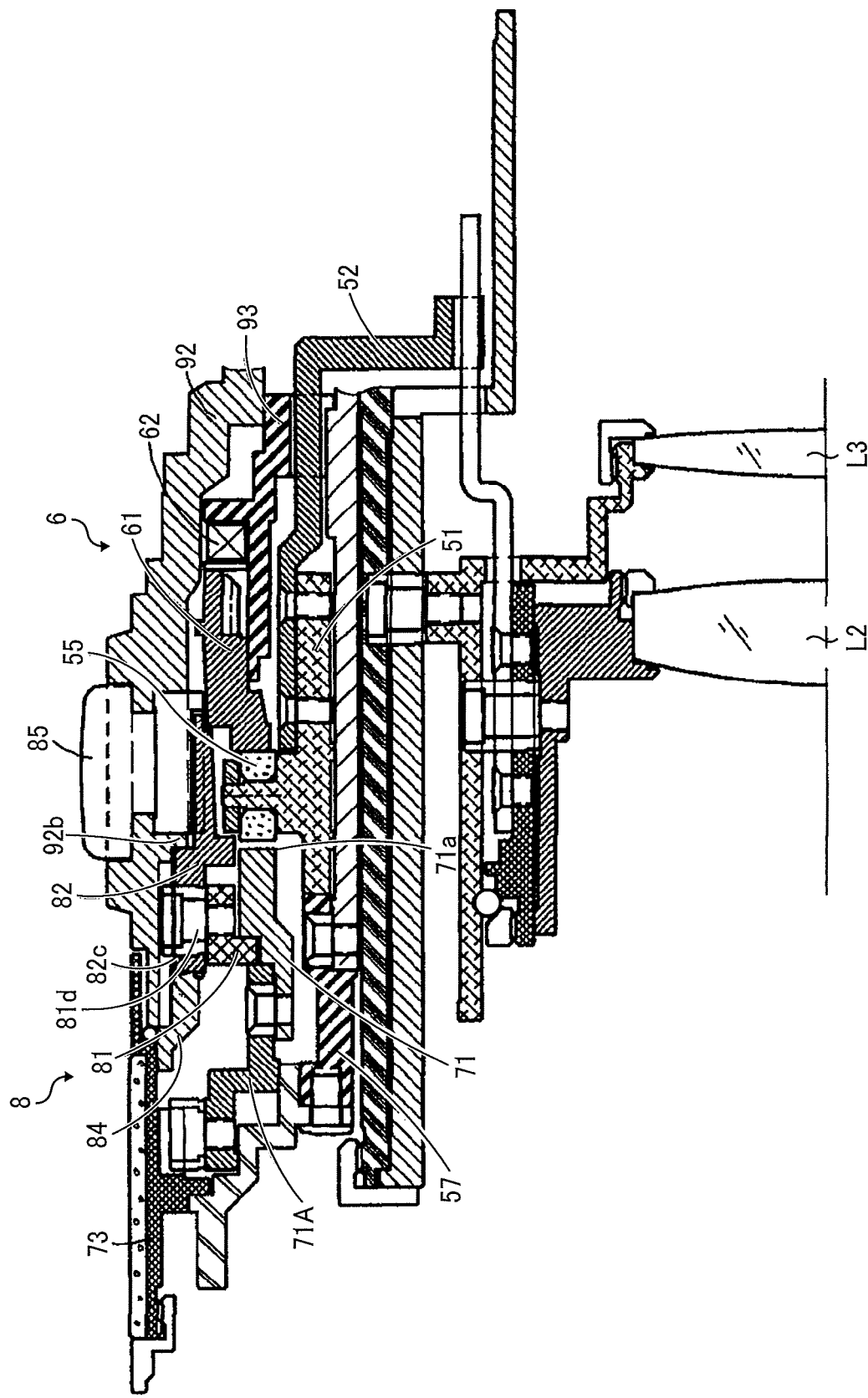
FIG. 11B is a longitudinal sectional view of the lens barrel according to the third embodiment with the release device separated from the differential device.

When the release switch 85 is operated to a position to release the manual focus adjustment mode, as illustrated in FIG. 11B, the release member 81 is moved toward the object side by the sliding of the cam groove 82c and the roller 81d accompanying the rotation of the release switch ring 82. At the same time, the drive ring 71 and the auxiliary drive ring 71A move toward the object side, together with release member 81. As a result, the slide face 71a of the drive ring 71 is separated from the planetary roller 55, and manual focus adjustment by the focus operation ring 73 is disabled. At this time, the second wave washer 62 moves the drive gear ring 61 to the object side. In the configuration according to the third embodiment, the groove 53a and the ball 54 of the rear support ring 53 as in the first and second embodiments are not included. Accordingly, the output ring 51 moves to the object side of the lens barrel 1 with the movement of drive gear ring 61, and the end face 51a on the object side of the output ring 51 contacts the second support ring 57, which restricts the movement of the output ring 51, thus keeping the drive ring 71 away from the planetary roller 55.

In the configuration according to the third embodiment, similarly to the first embodiment, the operation section including the release switch is provided to overlap the display section including the distance window and the distance display body in the direction of the optical axis and in the radial direction. This arrangement achieves a reduction in size of the lens barrel.

The operation section in the present disclosure is not limited to the release switch according to the first embodiment through the third embodiment, and may be any section for switching the inner device of the lens barrel. Therefore, any movable member configured to be moved by the operation section is not limited to the members according to the first embodiment through the third embodiment. Further, the display section in the present disclosure is not limited to the distance display section for indicating the focal distance as described in the first embodiment, and may be a focal-distance display section for indicating zooming data (lens focal length) or a F-number display section for indicating f numbers of lenses.

The present disclosure is not limited to the lens barrel such as the interchangeable lens described above, and may be applied to a lens barrel integrated with the camera body. Further, the present disclosure is not limited to the lens barrel of the camera for shooting a still image, and may be applied to a lens barrel of a camera for moving image shooting or to a lens barrel for a digital imaging device. Further, the embodiments of the present disclosure include the lens barrel as an interchangeable lens, an imaging device as a camera integrated with the body of the device, an imaging device for moving image shooting.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A lens barrel, comprising:
a movable device to adjust an optical system, the movable device including a ring that is rotatable around an optical axis in the lens barrel;
an operation section having a coupling section to be coupled with the movable device to control movement of the movable device; and
a display section disposed in line with the operation section in a direction around the optical axis of the lens barrel to overlap with the operation section in a direction of the optical axis, the display section including a display body that is movable in displaying a state of the optical system adjusted by the movable device,
wherein the display body of the display section is disposed to overlap the coupling section of the operation section in a radial direction of the lens barrel, and
wherein the display body of the display section radially projects from an outer-circumferential surface of the ring.

2. An imaging device comprising the lens barrel according to claim 1.

3. The lens barrel according to claim 1,
wherein the coupling section of the operation section is disposed radially outside the outer-circumferential surface of the ring, and
wherein the coupling section of the operation section is disposed in an area in a circumferential direction of the ring, and the display body does not move to the area when the ring rotates.

4. The lens barrel according to claim 1,
wherein the movable device is configured to adjust a focal position of the optical system,
wherein the display section is a distance display section to display the focal position of the optical system, and
wherein the display body is a distance scale body provided with a distance indication.

5. The lens barrel according to claim 4,
wherein the movable device further includes a differential device that includes a first input of a manual focus adjustment device and a second input of an automatic focus adjustment device of the optical system,
wherein the ring is an output ring of the differential device, and
wherein the operation section is a release switch to release a connected state of the manual focus adjustment device.

6. The lens barrel according to claim 5,
wherein the output ring supports a planetary roller in at least a part of the output ring in the circumferential direction, and
wherein the operation section is disposed in an area to which the planetary roller does not move when the output ring rotates.

7. The lens barrel according to claim 5, further comprising:
a stationary ring having a first opening and a second opening,
wherein in the first opening, the display section includes a distance window to enable visually recognizing a distance indication provided on a circumferential surface of the display body, and
wherein in the second opening, the release switch is disposed.

8. A lens barrel, comprising:
a movable device to adjust an optical system;
an operation section having a coupling section to be coupled with the movable device to control movement of the movable device; and
a display section disposed in line with the operation section in a direction around an optical axis of the lens barrel to overlap with the operation section in a direction of the optical axis, the display section including a display body that is movable in displaying a state of the optical system adjusted by the movable device,
wherein the display body of the display section is disposed to overlap the coupling section of the operation section in a radial direction of the lens barrel,
wherein the movable device includes a ring that is rotatable around the optical axis in the lens barrel,
wherein the display body of the display section is disposed on an outer-circumferential surface of the ring, and the coupling section of the operation section is disposed radially outside the outer-circumferential surface of the ring.

9. The lens barrel according to claim 8,
wherein the coupling section of the operation section is disposed in an area in a circumferential direction of the ring, and the display body does not move to the area when the ring rotates.

10. The lens barrel according to claim 8,
wherein the movable device is configured to adjust a focal position of the optical system,
wherein the display section is a distance display section to display the focal position of the optical system, and
wherein the display body is a distance scale body provided with a distance indication.

11. The lens barrel according to claim 10,
wherein the movable device further includes a differential device that includes a first input of a manual focus adjustment device and a second input of an automatic focus adjustment device of the optical system,
wherein the ring is an output ring of the differential device, and
wherein the operation section is a release switch to release a connected state of the manual focus adjustment device.

12. The lens barrel according to claim 11,
wherein the output ring supports a planetary roller in at least a part of the output ring in the circumferential direction, and
wherein the operation section is disposed in an area to which the planetary roller does not move when the output ring rotates.

13. The lens barrel according to claim 11, further comprising:
a stationary ring having a first opening and a second opening,
wherein in the first opening, the display section includes a distance window to enable visually recognizing a distance indication provided on a circumferential surface of the display body, and
wherein in the second opening, the release switch is disposed.

14. A lens barrel, comprising:
a movable device to perform a focus adjustment of an optical system, the movable device including a ring that is rotatable around an optical axis in the lens barrel;
a switch to switch between an automatic focus adjustment mode and a manual focus adjustment mode, with the movable device; and
a display section disposed to overlap the switch in a direction of an optical axis of the lens barrel and overlap the switch in a part in a radial direction of the lens barrel, the display section to display a state of the optical system adjusted by the movable device, wherein the display body of the display section radially projects from an outer-circumferential surface of the ring.

15. An imaging device comprising the lens barrel according to claim 14.

* * * * *